United States Patent [19]

Bonn

[11] Patent Number: 4,888,655
[45] Date of Patent: Dec. 19, 1989

[54] AIR FILTRATION SYSTEM FOR DISC DRIVES

[75] Inventor: Brian T. Bonn, Santa Cruz, Calif.

[73] Assignee: Seagate Technology, Inc., Scotts Valley, Calif.

[21] Appl. No.: 220,231

[22] Filed: Jul. 18, 1988

[51] Int. Cl.$^4$ .............................................. G11B 17/02
[52] U.S. Cl. .................................................. 360/97.03
[58] Field of Search ...................................... 360/97.03

[56] References Cited

U.S. PATENT DOCUMENTS

| | | | |
|---|---|---|---|
| 4,130,845 | 12/1978 | Kulma ................................ | 360/97.03 |
| 4,418,369 | 11/1983 | Applequist et al. ............... | 360/97.03 |
| 4,471,395 | 9/1984 | Beck et al. ........................ | 360/97.03 |
| 4,489,356 | 12/1984 | Farmer .............................. | 360/97.03 |
| 4,780,776 | 10/1988 | Dushkes ............................ | 360/97.03 |

Primary Examiner—Robert S. Tupper
Attorney, Agent, or Firm—Flehr, Hohbach, Test, Albritton & Herbert

[57] ABSTRACT

An improved air filtration system for a disc drive system having magnetic information storage media located within a sealed housing having upper and lower casing members. The media, as well as the majority of the drives components are primarily secured to the lower casing. The filtration system includes a breather filter and a recirculation filter that are both mounted to the upper casing such that when the drive is disassembled, the air filtration system is automatically removed from the drive to provide the operator with better access to the various drive components. The breather filter is placed above the disc pack in a region of low pressure to maintain the drive at above atmospheric pressure during operation. The recirculation filter is placed in a region having high air flow rates.

6 Claims, 3 Drawing Sheets

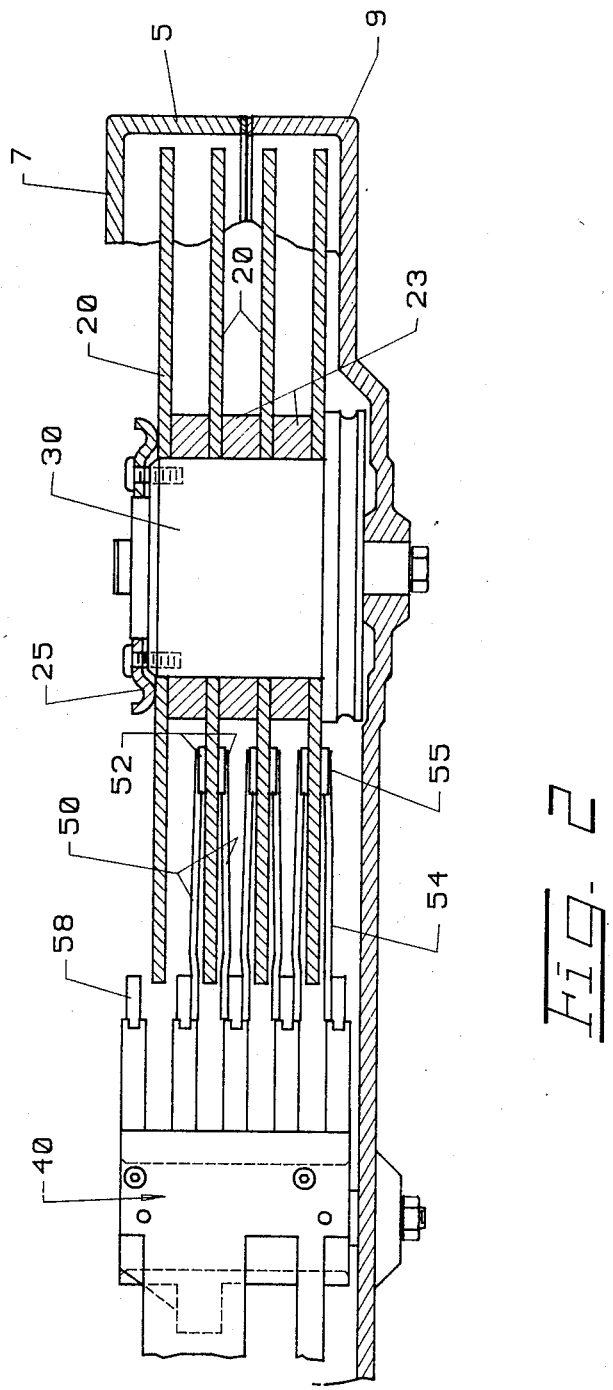

AIR FILTRATION SYSTEM FOR DISC DRIVES

The present invention relates generally to an improved air filtration system for disc drives.

BACKGROUND OF THE INVENTION

Disc drive machines record and reproduce information on a recording media. The media generally takes the form of circular information storage discs having a multiplicity of concentric tracks. Conventional Winchester type disc drives include a disc pack holding a plurality of vertically aligned rotating information storage discs, each having at least one associated magnetic head that is adapted to transfer information between the disc and an external system. Each head is carried by an elongated flexure arm. The flexure arms are vertically aligned and are each attached to a common head positioner assembly. The head positioner assembly may be either rotationally mounted, or may take the form of a linear carriage that is free to move back and forth along a single axis. In rotary mounted head positioner assemblies, a voice coil motor rotates the head positioner assembly about a pivot mechanism to precisely position the heads relative to the magnetic discs.

The housing is typically divided into upper and lower casings which are sealed together with a gasket to prevent the introduction of dirty air into the disc drive. The gasket also serves to dampen vibrations within the housing.

As will be appreciated by those skilled in the art, it is extremely important to the operation of the disc drive to maintain a dust free environment within the drive. To prevent dust particles from entering into the drive in the first place it is important to thoroughly filter any air that enters the drive from the outside. Traditionally drives are vented to the outside only through a breather filter that very efficiently filters dust particles from any air passing therethrough. However, since leaks do occasionally occur, it is desirable to operate the drive at pressures slightly above atmospheric pressures so that any leakage flows out of the drive as opposed to into the drive.

The principle source of dust within the drive is microparticles that flake off of the magnetic discs 20 by contact with the heads when the drive is started and stopped. Other parts that rub during operation can cause dust particles as well. Therefore, it is necessary to provide some internal filtering as well. Conventional filter systems tend to require bulky filtration systems that often are difficult to assemble and/or get in way during repair operations.

SUMMARY OF THE INVENTION

Accordingly, it is a primary objective of the present invention to meet these design requirements utilizing an air filtration system that has a low part count and is easy to assemble at low costs.

Another objective is to provide an air filtration system that will be automatically removed with the upper casing when the drive is disassembled.

To achieve the foregoing and other objects and in accordance with the purpose of the present invention, an improved air filtration system is provided for use in a disc drive systems. The disc drive includes a sealed housing having cast aluminum upper and lower casing members. The upper casing has a pair of filter support fingers extending internally of the housing. The media, as well as the majority of the drive's components are primarily secured to the lower casing. A recording media that includes a plurality of vertically aligned magnetic information storage discs arranged as a disc pack is journaled about a spindle hub for rotation during operation of the disc. The breather's location was chosen such that it produced the best pressure distribution throughout the drive, (i.e., above atmospheric pressure throughout). When the drive is in operation, the pressure on the inside of the breather filter is atmospheric. If it were not, then air flow through the breather would occur.

A recirculating filter is disposed within the housing adjacent the disc pack for removing dust particles from air circulating within the housing. The recirculating filter is carried by said filter support fingers.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 2 is a diagrammatic side view of the disc drive shown in FIG. 1.

DETAILED DESCRIPTION OF THE DRAWINGS

Figure 1:
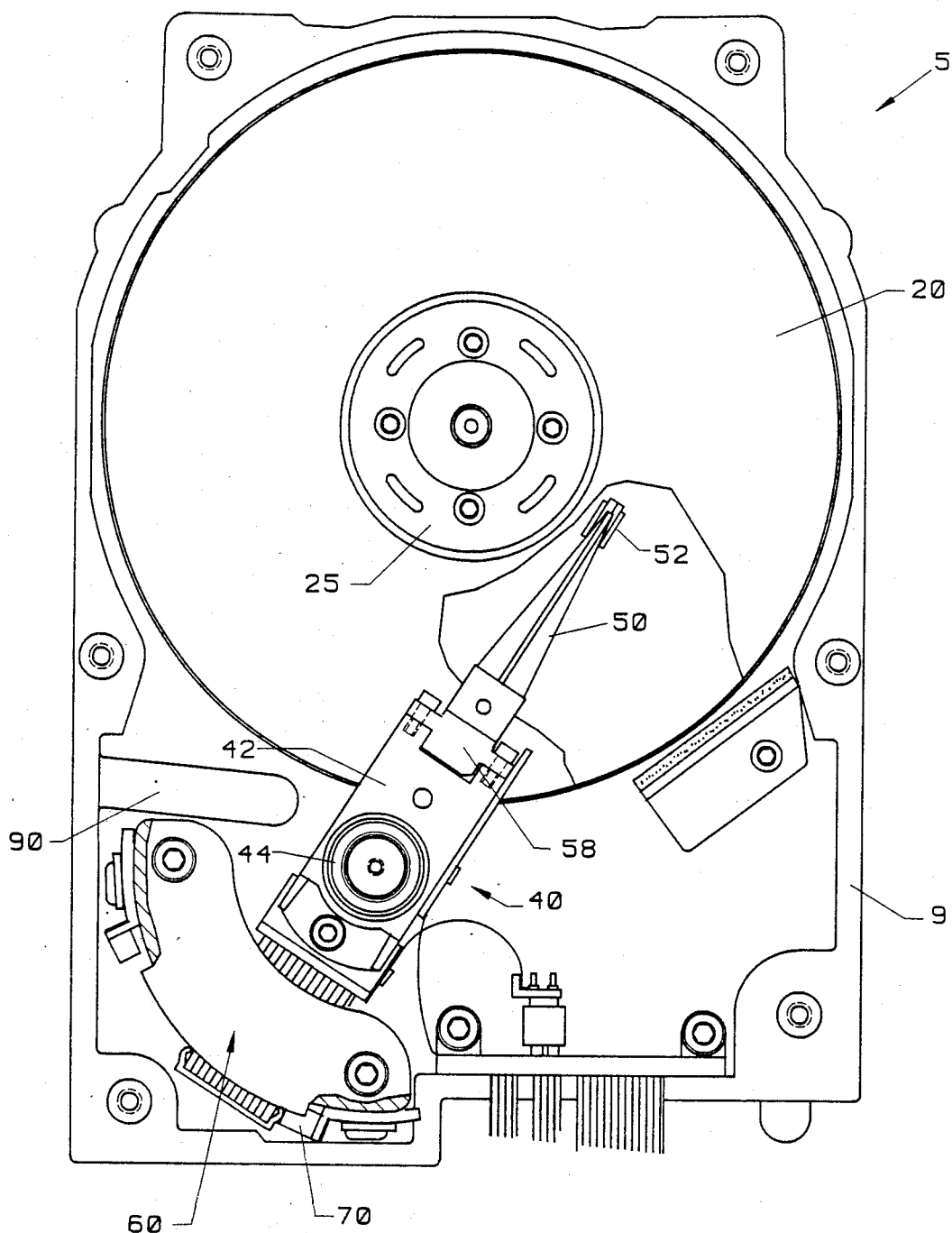
FIG. 1 is a diagrammatic top view of a disc drive that incorporates the present invention with its upper casing removed.
Figure 4:
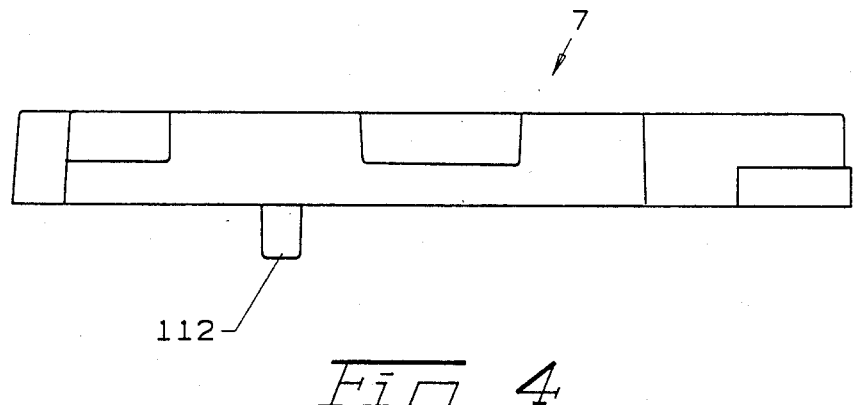
FIG. 4 is a diagrammatic side view of the upper casing shown in FIG. 3.

Referring first to FIGS. 1 and 2, a disc drive system suitable for incorporating the teaching of the present invention is shown in diagrammatic form. A plurality of information carrying magnetic discs 20 are journaled about a spindle motor assembly 30 within a housing 5 having upper and lower casing members 7 and 9 respectively. A gasket 11 is disposed between the top and bottom casing members to provide an air tight seal and to provide some damping for vibrations within the housing.

A head positioner assembly 40 is rotatably mounted between the upper and lower casings 7,9 in one corner of the housing 5. The head positioner assembly 40 carries a plurality of flexure arms 50 that each carry a magnetic data head 52 for reading information from and writing information onto the magnetic discs 20. The head positioner assembly 40 also carries a servo arm 54 which carries a servo head 55 for accurately positioning the data heds 52 relative to the information storage tracks22. A voice coil motor 60 is adapted to rotate the head positioner assembly back and forth such that the heads move in unison across the information storage discs. A magnetic latch 70 holds the head positioner assembly in place when the disc drive is not in use.

The rotation of the magnetic discs 20 causes air to circulate within the drive. In the embodiment chosen for the purposes of illustration, the discs rotate in a counter-clockwise manner when looking down on the discs as seen in FIG. 1. With such an arrangement, air tends to circulate in a counterclockwise direction within the housing (using the same reference). The largest airflows that occur outside of the disc pack are found in the location that is marked by shelf 90 in FIG. 1, and the corresponding location on the opposite side of the drive. It should be apparent that the airflow in the region of shelf 90 is away from the discs, while the airflow in the region on the opposite side of the drive is into the disc. In practice, a recirculating filter could be placed in either position.

Figure 3:
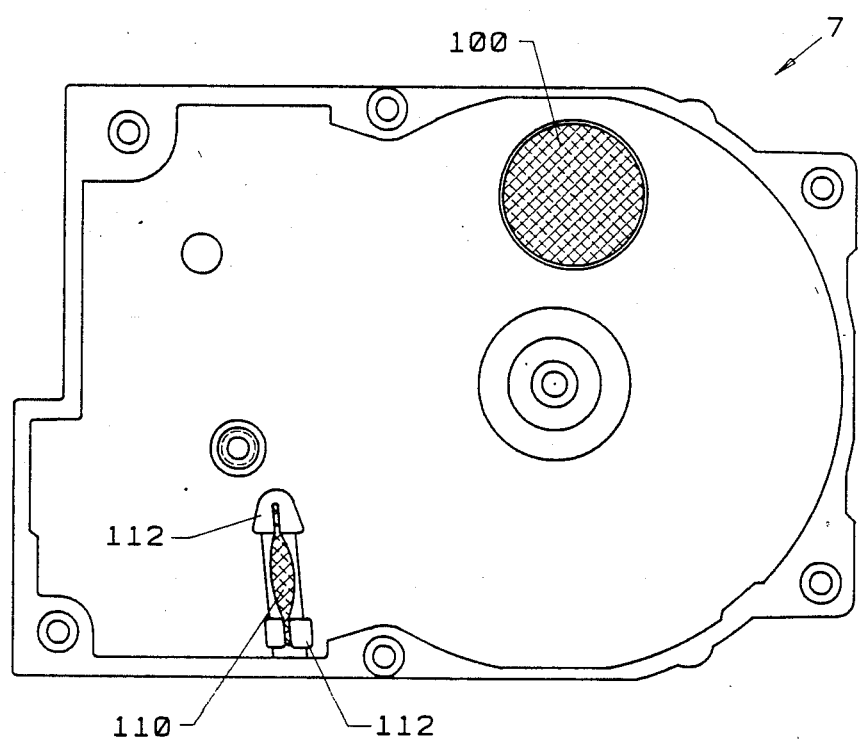
FIG. 3 is a diagrammatic bottom view of the upper casing shown in FIG. 1.

Referring next to FIG. 3, the filtration system chosen for the purpose of illustration includes a breather filter 100 and a recirculating filter 110 that are each carried by the upper casing 7. The filters 100 and 110 are provided to maintain a dust free environment within the interior of the drive. Both filters are electrostatic filters. The breather filter 100 is mounted within a recess in the upper casing 7 and serves primarily to prevent over or under pressurization within the drive. It is never intended to pass a steady airflow or substantial quantities of air. A wide variety of filters may be used, and by way of example a tight meshed electrostatic filter that is as close to 100 percent efficient as possible works well. The electrostatic filter is placed on a plastic mylar ring that fits into the breather recess in upper casing 7 and has an adhesive layer on one side that bonds the filter to the casing as well.

The breather filter is positioned above the disc pack in a position which is experimentally determined to have a relatively low pressure when the disc drive is in operation. By so placing the breather filter, the pressure distribution within the drive will consistently remain above atmospheric pressure, which is desirable since if any leaks develop within the drive, air will leak out of the drive instead of into the drive. It is important to leak outward since any air that leaks into the drive outside of the breather filter 100 would be unfiltered and could cause problems once inside the drive. In the event of a leaky drive using the arrangement described herein, the only air entering the drive would arrive through breather filter 100 and thus be well filtered.

The recirculating filter 110 is also an electrostatic filter. However, unlike the breather filter which is intended to pass only small volumes of air, the objective of the recirculating filter is to have a large percentage of the moving air within the disc drive pass therethrough. Therefore, the recirculating filter must not have a high drag coefficient. To reduce drag, significantly lower efficiency electrostatic filters may be used for the recirculating filter than the breather filter. Suitable electrostatic filters are manufactured by 3M of Minneapolis Minn.

The recirculating filter is held in place by a pair of fingers 112 that extend downward from upper casing 7. The fingers 112 taper inward as they approach the upper casing to tightly hold a filter inserted therein. An important feature of the invention is that the upper and lower casings 7, 9 are fashioned from cast aluminum and that the fingers 112 form a portion of the cast upper casing member 7. The fingers are placed on the upper casing 7 rather than the lower casing 9 so that when the drive is disassembled for repair, the entire air filtration system is removed with the upper casing thereby providing clear access to the disc without requiring the removal of any of the filters.

A low lying shelf 90 is provided on the lower casing member 9 opposite the fingers 112 to capture the recirculating filter. The fingers are designed such that they extend to just above the shelf 90, however, they never actually contact during normal operation to reduce the amount of vibration transferred between the casing members. By way of example, spacing of in the range of 50 to 75 mils is appropriate for between fingers 112 and shelf 90.

During assembly, the rectangular shaped recirculation filter is inserted between the tapered fingers 112 which will firmly hold the filter in place. The filter extends slightly above the fingers 112 and thus, when the upper casing is installed, the filter is compressed against the shelf 90.

Although only one embodiment of the present invention has been described herein, it should be understood that the present invention may be embodied in many other specific forms without departing from the spirit or scope of the invention. Particularly, it should be appreciated that the actual filter materials used may be widely varied. Further, it is contemplated the disc drive layout, as well as the described drive features may be widely varied without departing from the spirit of the invention. Therefore, the present examples and embodiments are to be considered as illustrative and not restrictive, and the invention is not to be limited to the details given herein, but may be modified within the scope of the appended claims.

I claim:

1. A disc drive comprising:
   a housing including cast upper and lower casing members, the upper casing having a pair of filter support fingers extending internally of said housing;
   a spindle motor assembly mounted to the lower casing member, the spindle motor assembly having a rotatable spindle hub;
   a recording media including a plurality of vertically aligned magnetic information storage discs arranged as a disc pack and journaled about said spindle hub for rotation with the spindle hub during operation of the disc drive;
   a breather filter mounted to the upper casing above the disc pack in a region of low pressure during operation of the disc drive to maintain a pressure distribution above atmospheric pressure within the disc drive during operation; and
   a recirculating filter disposed within the housing adjacent the disc pack, the recirculating filter being carried by said filter support fingers.

2. A disc drive as recited in claim 1 wherein said lower casing includes a shelf positioned opposite said finger support fingers to contain the recirculating filter.

3. A disc drive as recited in claim 2 wherein said shelf and said fingers do not contact during normal operation.

4. A disc drive as recited in claim 3 wherein said recirculating filter and said breather filter are each electrostatic filters.

5. A disc drive as recited in claim 3 wherein said shelf is cast with said lower casing.

6. A disc drive as recited in claim 5 wherein said fingers taper towards each other as they approach said upper casing.

* * * * *